Patented Nov. 29, 1949

2,489,704

UNITED STATES PATENT OFFICE 2,489,704

ACCELERATOR OF VULCANIZATION

Arnold R. Davis, Riverside, Conn., assignor to American Cyanamid Company, New York, N. Y., a corporation of Maine No Drawing. Application October 1, 1947, Serial No. 777,367

6 Claims. (Cl. 260—785)

This invention relates to rubber vulcanization and in particular to new and improved arylthiazyldisulfide compositions, to methods of making them and to their use as vulcanization assistants. More specifically, the invention relates to new and improved methods of controlling dusting and sticking of arylthiazyldisulfides, such as benzothiazyldisulfide in the compounding thereof with rubber polymers.

For many reasons, arylthiazyldisulfides have become widely used as an accelerator in rubber vulcanization, particularly in natural rubber and in synthetic rubbers of the butadiene-styrene and butadiene-acrylonitrile copolymer types. This widespread use has developed despite a number of inherent physical disadvantages in the handling of these materials and in compounding of rubber polymers with these materials.

Benzothiazyldisulfide is an excelent representative member of the useful arylthiazyldisulfides. This is true, not only chemically, but in its widespread use and in the problems involved in that use. For purposes of discussion of the present invention, therefore, it will be taken as illustrative. The advantages of the present invention, however, are not necessarily limited thereto in actual practice.

Benzothiazyldisulfide has achieved its widespread utilization even though it fails to exhibit all the properties desired in an ideal accelerator. For example, at 60° C. it is not soluble in rubber to the extent that it is often necessary or desirable in use. Therefore it must be carefully and uniformly distributed through the mass. To do so requires its use as a fine, almost impalpable, powder. This in turn causes excessive dusting.

With other compounding ingredients, attempts have been made to control the tendency to dust or fly by adding an oil thereto. These have included both mineral oils and fatty acid-glyceride oils such as palm oil, fish oils and the like. These attempts were not wholly successful. Some oils do not readily disseminate and may produce non-uniformity in the final product. Such oils also have the tendency to "sweat" out under heat and/or pressure. On the other hand, many oils which do dissolve readily in rubber have a tendency to produce excessive tackiness.

Any tendency of a composition or one or more of its ingredients to stick to hot rolls, or other compounding equipment, at various times in the past also have been overcome by oiling. For example, attempts have been made to solve the problem by oiling the hot surfaces. This again was not wholly satisfactory, not only because of labor factors involved but also for the reasons noted above as to the effect of oils on the rubber products.

In the case of arylthiazyldisulfides, oiling alone, to prevent either dusting or sticking, is impractical. With benzothiazyldisulfide, for example, there is no marked tendency of the untreated material to stick to hot mill rolls or the like. In the presence of oils, the disulfide sticks to the hot metal surfaces so badly as to make uniform dissemination impossible. On the other hand, since it is the oil which causes sticking, oiling is not available as an anti-sticking measure.

There remains, then, a demand for a practical way of eliminating the dusting and sticking problems in connection with arylthiazyldisulfides such as benzothiazyldisulfide. At the same time, any materials used for the purpose must not be such that, due to their inherent nature or to the amounts required, they interfere with proper compounding. Neither should they have an adverse effect on the finished product. It is, therefore, the principal object of the present invention to solve the dusting and sticking problems by using methods and materials not subject to the noted difficulties.

Surprisingly enough, in view of these experiences, the problem has been solved, in accordance with the present invention, by precompounding the arylthiazyldisulfide with a combination of a small proportion of mineral oil antidusting agent and, as a "lubricant," a small amount of minutely particulate zinc salt or soap of one or more higher aliphatic acids. These two agents, though added originally for different purposes, in combination produce a result better than that obtained with either alone. This complete effectiveness is particularly remarkable in view of the fact that these and similar agents, when used somewhat differently, in the past were not found wholly successful.

Each of the two treating materials for the disulfide has certain limitations. For example, the oil used must control excessive dusting. Further, oil having some affinity for the rubber without being excessively soluble is desirable. It was found that a number of oils may be used. Light mineral oils, Diesel fuel oil, light furnace oils and comparable grades are wholly satisfactory. Being economical and easily handled they are to be preferred.

The amount used should not adversely effect the final vulcanizate. Again the fuel oils are suitable. An amount of the oil varying from about 0.5–2.5% of the weight of the disulfide will adequately control the tendency of the latter to dust and fly. A good practice is to use about 1–2%, usually about 1.5%, in which amounts no compounding or vulcanizing troubles are encountered.

In choosing the particular lubricant to be used, certain limitations also must be considered. It must be compatible with the rubber composition. It must not prevent dispersion of the arylthiazyldisulfide. It must not be used or required in sufficient amounts to produce an adverse effect on the vulcanizate. It must be capable of being dispersed uniformly in or on the disulfide. Preferably it should promote dispersion of the disulfide.

The usual mineral or fatty acid-glyceride oils used as anti-dusting agents do not meet these requirements. Those fatty acids which possess lubricating ability are not capable of ready dispersion and usually undesirable amounts are required. In general also, the fatty acids are too soft, too low melting and too hard to disperse. Soluble monovalent metal soaps thereof, i. e., the potassium, sodium and ammonium soaps, are also too soft.

It has been found, however, that certain divalent metal salts of some aliphatic fatty acids, i. e., those of copper, zinc and the alkaline-earth minerals have the proper physical consistency, and lubricating ability. Of these, the zinc salts or soaps are to be preferred since zinc oxide is almost universally used in formulations and since the presence of metals other than zinc are often undesirable.

On the other hand, it has been found that most zinc soaps as they are commercially obtainable, zinc stearate for example, appear to be required in amounts greater than usually desired in order to insure lubrication of all the disulfide. In general, use of more than about two or possibly two and one-half percent of the weight of the arylthiazyldisulfide is undesirable. Ordinary commercial zinc stearate, for example, if used in such small amount is not wholly satisfactory.

In accordance with the present invention it has been found that this is due to the physical condition of the zinc salt itself. As noted above, the soap used should be minutely particulated, by comminution or by its mode of preparation. According to this invention, however, it has been found that size, while a factor, is not as important as it is that the zinc salt have the necessary degree of covering power.

The latter is extremely difficult to evaluate numerically. Of late, a standard of comparison of covering power, based on the area of wet glass a specific amount of material can be spread to cover, has been accepted. In testing, a two-liter glass cylinder is used. Into this is charged 100 grams of distilled water and fifty milligrams of the powder. The cylinder is shaken in horizontal position for one minute, then rotated for three minutes while being raised to a vertical position. A film adheres to the glass. The height of the film enables computation of the covered area. Comparative figures are expressed as square centimeters per gram.

It was found that when measured by this standard, ordinary commercial stearates have film coverages averaging about 9000 sq. cm./gm. According to the present invention, to be effective in preventing sticking of arylthiazyldisulfides treated with 0.5 to 2.5% by weight of oil, to hot surfaces, it is necessary to use amounts of such stearates in excess of the desired upper limit. On the other hand, wholly effective results were obtained with as little as 0.5% by weight of zinc stearate, zinc palmitate and the like, having covering film areas of 15,000 to 25,000 sq. cm./gm.

It is an advantage of the present invention that the oiled disulfide, lubricated with the high covering power salts, may be incorporated in any desired way during compounding. For example, it may be milled in directly in the desired amount or by master batch operation during compounding. The latter is particularly desirable and prior to the present invention has not been practical with materials such as benzothiazyldisulfide. Using the oiled and lubricated disulfides of this invention, master batches of 12.5–25% accelerator content are readily prepared. As high as 50% may be made if so desired. The master batches, after storage, may be compounded, if so desired, without further refining. Where time and equipment is available, such refining is helpful in many cases in assuring uniform blending and produces better vulcanizates.

Comparison of both synthetic and natural rubber compositions containing equivalent proportions of polymer and other compounding ingredients, but with the accelerator added in various ways has been made. Such tests show the effectiveness of the blended accelerator of the present invention in actual use. An illustrative comparison test is shown in the following example. All parts therein are by weight except as otherwise noted. Materials used are shown, as are test results on the products.

EXAMPLE 1

A blend of four commercially-available butadiene-1,3-styrene copolymer rubbers (GR–S) was prepared. One sample was mixed in a Banbury mixer, the accelerator added and mixing continued (at 153° C.) for five minutes, the batch being dumped and sheeted on a 6″ x 12″ mill at 60° C. This is shown as master batch A. Another portion was broken on a cold mill (35° C.) for seven minutes. This was divided into two parts, each being milled on a 6″ x 12″ mill at 100° C., milled for 0.5 minute, the accelerator added and milling continued for 4.5 minutes.

*Table I*

|  | Master Batch | | |
|---|---|---|---|
|  | A | B | C |
| GR-S (blend) | 175 | 150 | 150 |
| Benzothiazyldisulfide (untreated) | 25 |  |  |
| Benzothiazyldisulfide treated with 1.5% mineral oil |  | 50 |  |
| Benzothiazyldisulfide treated with 1.5% Zn Stearate 1.0–2% oil |  |  | 50 |
| Per Cent Accelerator | 12.5 | 25 | 25 |
| Dusting | Bad | No | No |
| Accelerator Caking | No | Bad | No |
| Dispersion | Fair | Poor | Good |

Master batches A and C were used in preparing test samples containing 1.5% accelerator to compare them with direct milling of 1.5% of accelerator and with each other. Illustrative results are shown in the following table.

*Table II*

| Sample | D | E | F | G[1] |
|---|---|---|---|---|
| GR-S (same blend) | 100 | 89.5 | 95.5 | 95.5 |
| Untreated Benzothiazyldisulfide | 1.5 | | | |
| Master Batch A | | 12 | | |
| Master Batch C | | | 6 | 6 |
| Easy Processing Channel Black | 50 | 50 | 50 | 50 |
| Zinc Oxide | 5 | 5 | 5 | 5 |
| Sulfur | 2 | 2 | 2 | 2 |
| Oil Softener | 5 | 5 | 5 | 5 |

SHORE HARDNESS (60 MIN. CURE 141° C.)

| | | | | |
|---|---|---|---|---|
| 0.5″–30″ dwell | 68–58 | 66–55 | 68–58 | 68–58 |

TENSILE TESTS (60 MIN. CURE 141° C.)

| | | | | |
|---|---|---|---|---|
| Unaged: | | | | |
| Modulus (200% elongation) | 550 | 450 | 550 | 525 |
| Tensile Strength (#/sq. in.) | 3,100 | 2,100 | 2,975 | 3,300 |
| Elongation, Per Cent | 605 | 530 | 585 | 670 |
| Aged (48 Hrs. at 100° C.): | | | | |
| Modulus (200% elongation) | 1,475 | 1,375 | 1,600 | 1,525 |
| Tensile Strength (#/sq. in.) | 2,675 | 1,950 | 2,775 | 2,825 |
| Elongation, Per Cent | 305 | 260 | 300 | 325 |

[1] Master batch refined 6 times through mill.

It is an advantage of the present invention that it is not limited to any particular zinc soaps, or to any special degree of purity. Commercial grades as well as blends and mixtures were found wholly practical provided the covering power is maintained sufficiently high. It is preferable that the acid from which the soap is derived contain eight or more carbon atoms. Saturated acid soaps were found preferable although in mixtures and blends small amounts of unsaturated acid soaps such as that of oleic acid are permissible. Soap in blends should preferably average out to twelve carbon acids content in blends although zinc caprylate alone was found quite useful. Zinc laurate was also found quite effective. Zinc palmitate was found preferable. A number of typical blends with benzothiazyldisulfide containing about 1.5% of mineral oil were made up. Illustrative samples are shown in the following table in which the amounts are expressed as parts by weight.

*Table III*

| | A | B | C | D | E | F | G | H | I | J |
|---|---|---|---|---|---|---|---|---|---|---|
| Oiled (1.5%) Benzothiazyldisulfide | 50.0 | 49.55 | 49.25 | 49.25 | 49.25 | 49.25 | 49.25 | 49.75 | 49.65 | 49.55 |
| Zn Stearate | | 0.45 | | 0.45 | 0.45 | 0.25 | | 0.25 | | |
| Zn Caprylate | | | 0.75 | | | 0.25 | | | | |
| Zn Laurate | | | | 0.30 | | 0.75 | | | | |
| Zn Palmitate | | | | | 0.30 | | 0.75 | | 0.35 | 0.45 |
| Total % Lubricant | 0.0 | 0.9 | 1.5 | 1.5 | 1.5 | 1.5 | 1.5 | 0.5 | 0.7 | 0.9 |

These blended accelerators were then mill tested at 90° C. for ease of incorporation. It was found that the benzothiazyldisulfide treated with oil alone (blend A) stuck badly to the back roll. The other blends were effective in preventing sticking, permitting ready incorporation. This was found true of both natural and synthetic rubbers.

I claim:

1. The method of preventing dusting and sticking of arylthiazyl disulfides during compounding by hot mastication which comprises pretreating the disulfide by adding thereto 0.5–2.5% by weight of a light mineral oil and 0.5–2.5% by weight of a soap selected from the group consisting of the zinc soap of the aliphatic fatty acids of 8–22 carbon atoms and mixtures thereof, said soap being capable of producing a film on wet glass of 15,000–25,000 square centimeters per gram and uniformly blending the mixture.

2. A process according to claim 1 in which the disulfide is benzothiazyldisulfide.

3. A process according to claim 2 in which the zinc soap content is a mixture which does not exceed a total of more than 2.0% by weight of the disulfide, at least 50% of the soap content comprising zinc palmitate.

4. A novel composition of matter comprising a powdered arylthiazyldisulfide having intimately admixed therewith from 0.5–2.5% by weight thereof of a light mineral oil and 0.5–2.5% by weight of a soap selected from the group consisting of the zinc soap of the aliphatic fatty acids of 8–22 carbon atoms and mixtures thereof, said soap being capable of producing film on wet glass of 15,000–25,000 square centimeters per gram.

5. A composition according to claim 4 in which the disulfide is benzothiazyldisulfide.

6. A composition according to claim 5 in which the zinc soap content is a mixture which does not exceed a total of more than 2.0% by weight of the disulfide, at least 50% of the soap content comprising zinc palmitate.

ARNOLD R. DAVIS.

REFERENCES CITED

The following references are of record in the file of this patent:

UNITED STATES PATENTS

| Number | Name | Date |
|---|---|---|
| 2,421,243 | Curtis | May 27, 1947 |